United States Patent
Schroder et al.

[11] 3,763,955
[45] Oct. 9, 1973

[54] ARRANGEMENT FOR CONTROLLING THE STEERING OF VEHICLES DIRECTED ALONG A PREDETERMINED PATH

[75] Inventors: Karl-Heinz Schroder, Gummersbach; Wolfgang Zwicker, Olpe, both of Germany

[73] Assignee: Pulsotronic Merten KG, Gummersbach, Germany

[22] Filed: Dec. 2, 1971

[21] Appl. No.: 204,274

[30] Foreign Application Priority Data
Dec. 4, 1970 Germany............... P 20 59 659.2

[52] U.S. Cl. .................................. 180/98, 318/587
[51] Int. Cl. ............................................. B60k 27/06
[58] Field of Search ........................... 180/98, 79.1; 318/580, 587

[56] References Cited
UNITED STATES PATENTS

| | | | |
|---|---|---|---|
| 3,085,646 | 4/1963 | Paufue .................................. | 180/98 |
| 3,018,367 | 1/1962 | Mountjoy .......................... | 180/98 X |
| 3,235,024 | 2/1966 | Barrett, Jr. ......................... | 180/79.1 |
| 2,331,144 | 10/1943 | Sitter ................................. | 180/79.1 |
| 3,033,305 | 5/1962 | Harned et al. ..................... | 180/79.1 |
| 3,039,554 | 6/1962 | Hosking et al. ................ | 180/79.1 X |
| 3,474,877 | 10/1969 | Wesener .............................. | 180/98 |
| 3,614,990 | 10/1971 | Schnitzler ........................... | 180/98 |

Primary Examiner—Kenneth H. Betts
Assistant Examiner—John P. Silverstrim
Attorney—Michael S. Striker

[57] ABSTRACT

An arrangement for controlling unmanned vehicles to drive along a predetermined path on which a guide track is laid. The guide track has a border of electrically conductive and non-conductive material. The vehicle carries analog signal generators which emanate a magnetic field that is damped by the electrically conductive material. The signal generators provide positive or negative signals depending on the displacement of the projected border relative to the centerline of the active zone of the signal generators. The generators provide a zero signal when the projected border coincides with the centerline of the active zone.

24 Claims, 7 Drawing Figures

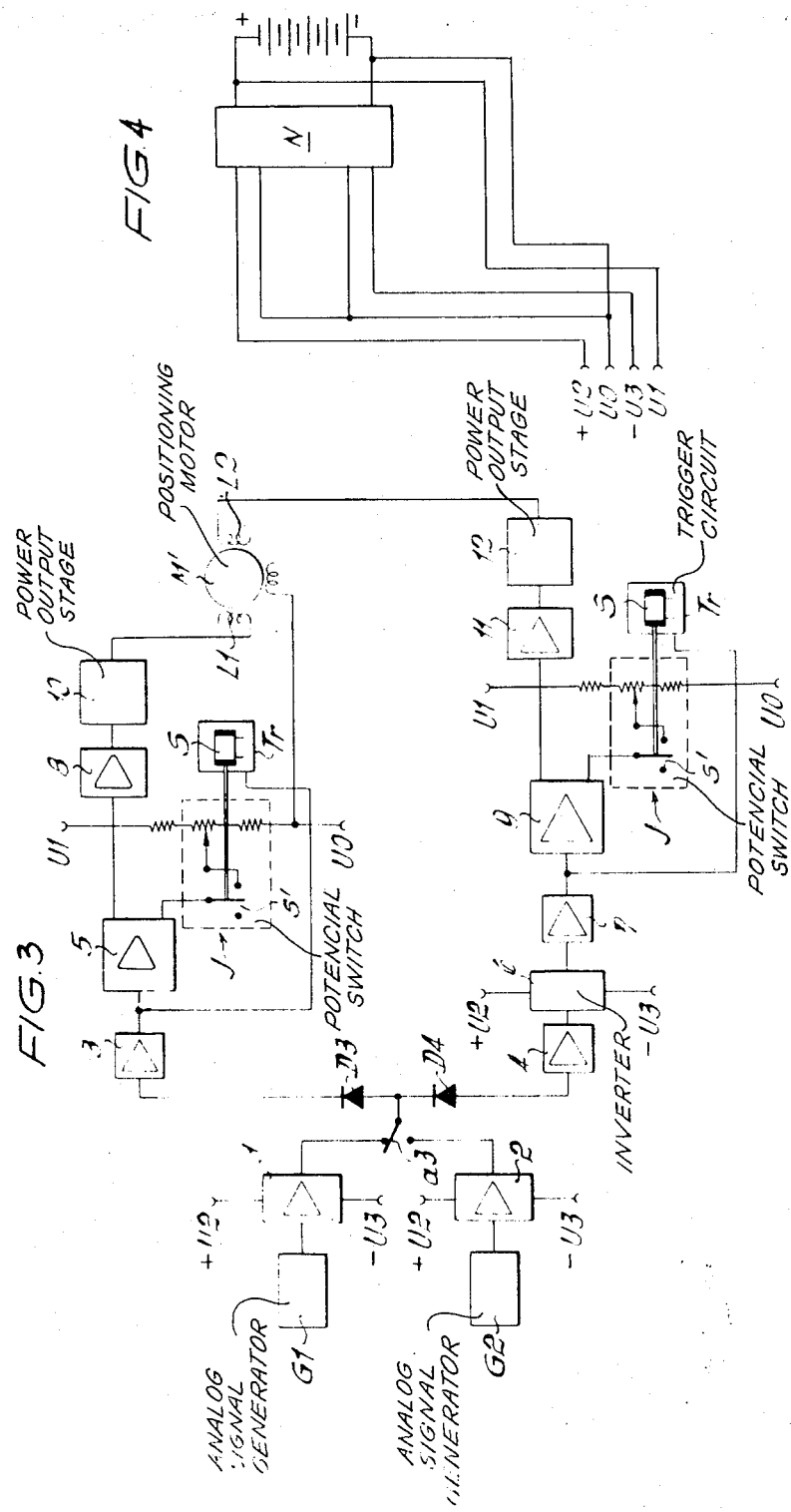

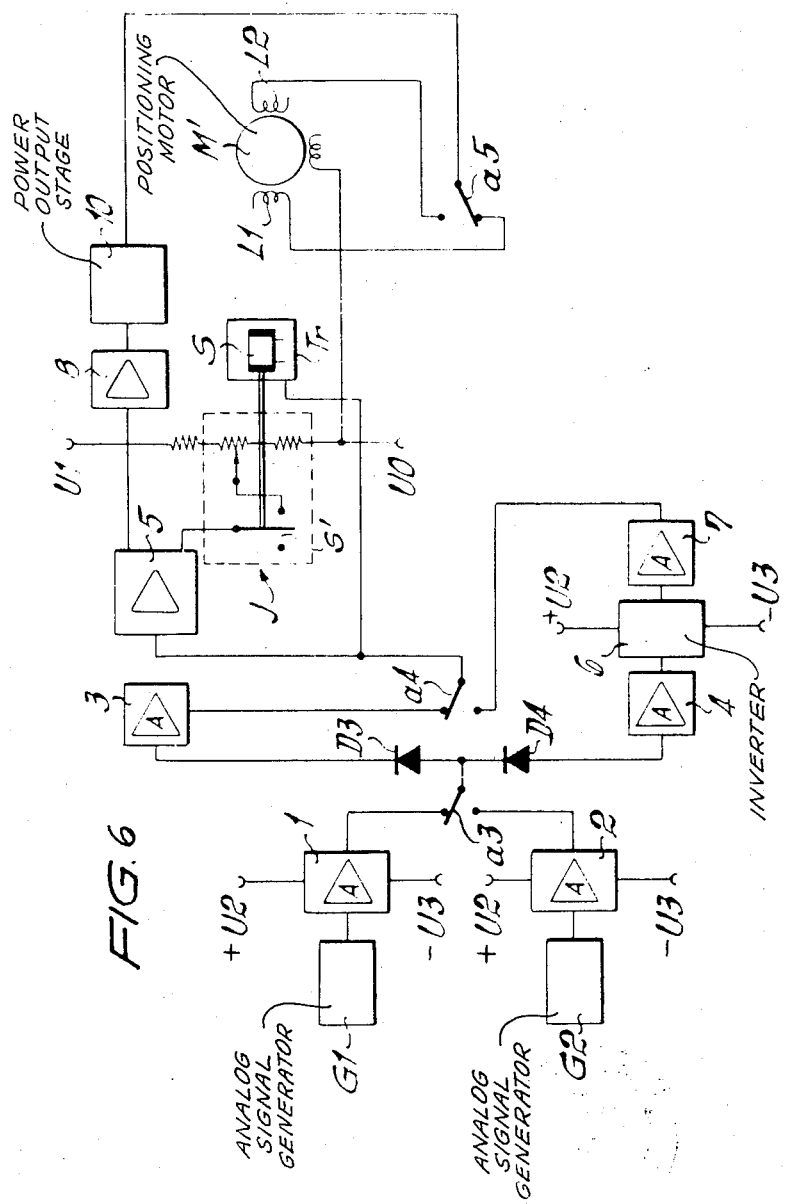

ARRANGEMENT FOR CONTROLLING THE STEERING OF VEHICLES DIRECTED ALONG A PREDETERMINED PATH

BACKGROUND OF THE INVENTION

The present invention relates to a regulating arrangement for controlling manless vehicles, particularly those vehicles used for ground-level conveyors, which drive along a guided path.

In controlling arrangements used for this purpose, it is known to lay sheet metal strips along the driving path of the vehicle, and to provide the vehicle itself with at least two magnetic sensors. The spacing of these sensors from each other is equal to the width of the sheet metal strip. Each of the sensors forms a magnetic circuit, in which the magnetic flux depends upon the air gap which prevails. The two sensors transmit control signals in correspondence to the prevailing magnetic fluxes. When the control signals exceed a predetermined threshold level, a steering programmer emits a respective or corresponding steering signal.

In conjunction with an arrangement of the preceding species, it is necessary to use magnetically conductive material for the sheet metal strips. As a result, only iron sheet metal becomes, thereby, practical. The use of such iron sheet metal, however, has different disadvantages incurred in laying the sheet metal strips. Thus, the laying of the sheet metal strips along curves, is made more difficult. Corrosion or rusting may also set in. The pulse-signal control used in the conventional controlling circuitry, furthermore, results in increased operating equipment and circuitry in order to produce a smoothly operating vehicle-driving arrangement.

SUMMARY OF THE INVENTION

It is an object of the present invention to improve upon the conventional control arrangements for unmanned vehicles.

It is also an object of the present invention to provide a vehicle control arrangement which follows an edge or line positioned along the path of motion with an electrically conductive material.

It is a further object of the present invention to provide a vehicle control arrangement, as set forth, which senses and samples the electrically conductive edge or line without contacting the edge.

A still further object of the present invention is to provide steering of the vehicle in accordance with the displacement of the vehicle as sensed relative to the edge, as set forth.

The objects of the present invention are achieved by providing a borderline or edge for guidance purposes. The borderline is used between electrically conductive and non-conductive material, and the vehicle is provided with an analog signal generator which emanates a high-frequency magnetic field. This field impinges upon the electrically conductive material and becomes damped by this material. The projection of the borderline upon the centerline of the active zone of the signal generator, effects the output voltage of the generator, and this output voltage is either positive or negative depending on the sidewise displacement of the vehicle. The output voltage, moreover, is substantially proportional to the displacement.

In accordance with the present invention, it is only required to fix the analog signal generator at a predetermined distance from the conductive line. The signal generator is connected through proper circuitry and amplifiers with a positioning element. In this case, the torque as, for example, the steering motor output is responsive to the signal generator. A vehicle equipped in this manner follows directly the conductive line, and smoothly operating steering and driving even along curves is attained.

In order to expand as desired the path of motion, it is essential to provide branches and switching devices for switching tracks, to enable each desired location to be reached without having to take the long way or route. In accordance with a further feature of the present invention, this expansion of the track network is fulfilled by providing strips of electrically conductive material through self-adhesive aluminum foil, for example. With such self-adhesive aluminum foil, a low-cost track system is obtained which is also simply changeable, when desired. An analog signal generator is associated with each edge of the strip, whereby only one respective edge of the foil is sensed or sampled by the associated signal generator. The second signal generator is, thereby, not in operation. Track switching is accomplished through switching to a second signal generator. The switching process can be performed either manually or through reed contacts, or through wireless transmission directly before the switching track is attained. When driving through intersections or crossovers, the steering motor is switched off during the time interval required for the crossing. The switching-off of the steering motor is accomplished through a reed contact, independent of the vehicle velocity. After the sensing signal generator or transducer has sensed that the crossing has been completed, reactivation of the steering motors takes place.

In accordance with a further feature of the present invention, a proximity switch is provided on the front axle of the vehicle behind both signal generators. This proximity switch is in operation at all times. If, as a result of malfunction, the displacement motor does not correct the course of the vehicle, and the vehicle leaves the control foil, then the proximity switch switches off the controlled electronic circuitry so that the vehicle is brought to a standstill.

Since unevenness of the floor can cause the control circuitry to function in a non-smooth manner, whereby displacements relative to the edge can be effected, a small signal generator can be provided over the control foil, in accordance with the present invention. This small analog signal generator is designed so that spacing variations as a result of unevenness in the floor causes the signal generator to emit a similar output signal as the remaining analog signal generators. Through the use of a compensation circuit, the noise signals stemming from the variations in spacing or distance are compensated so that only the amplitude damping through the sidewise displacement relative to the edge is processed or used for control purposes.

The signal processing is achieved in a separate control circuit of electronic design. As a result of the displacement relative to the edge of the metallic foil with respect to the active zone analog signal generator, the output voltage of the generator varies substantially proportional to the displacement for the largest part of the region. Through a following operational amplifier provided with zero point setting or resetting the output voltage becomes amplified. The zero point of the amplifier is displaced to substantially the center of the output-voltage characteristics of the signal generator, in the proportional part or region of the characteristics. In this manner, the projection of the edge upon the centerline of the active zone of the signal generator causes a zero output voltage from the generator. A sidewise displacement relative to the edge, on the other hand, causes a positive or negative output voltage depending on the direction of the displacement.

When switching tracks, the corresponding analog signal generator is activated into operation either through manual means, or through reed contacts or through wireless remote control. Reversing of the terminals of the positioning motors is, here, required for the analog signal generator, since the active signal generator provides a mirror function of the output-voltage characteristics to the signal generator, in view of the opposite damping characteristics. The switching reversal takes place in the input operational amplifier of one of the analog signal generators. Thereafter, positive or negative voltage signals are separated. The positive signal is amplified several times, and is then applied to the coil of the positioning motor for determining a predetermined operating direction of the motor.

In order to switch off the inertia response of the positioning motor to thereby achieve a smooth drive, an auxiliary voltage is applied to the signal when a predetermined threshold level of a trigger circuit is attained as, for example, 0.5 volts. In this manner, an output torque of the positioning motor is obtained immediately upon further rise or increase of the signal. Below this threshold level, the steering motor has no torque output.

The negative signal is processed, as described above, in an operational amplifier after phase reversal, and is then applied to the corresponding winding or coil of the positioning motor so as to drive the motor in the proper direction.

The novel features which are considered as characteristic for the invention are set forth in particular in the appended claims. The invention itself, however, both as to its construction and its method of operation, together with additional objects and advantages thereof, will best be understood from the following description of preferred embodiments when read in connection with the accompanying drawing.

BRIEF DESCRIPTION OF THE DRAWING

FIG. 3 is a block diagram of a control system used to control the vehicle for driving along the track system of FIG. 1;

FIG. 4 is a block diagram of a voltage supply circuit used for the control circuit of FIG. 3;

FIG. 6 is a block diagram of another embodiment of the control circuit of FIG. 3.

DESCRIPTION OF THE PREFERRED EMBODIMENTS

Figure 1:
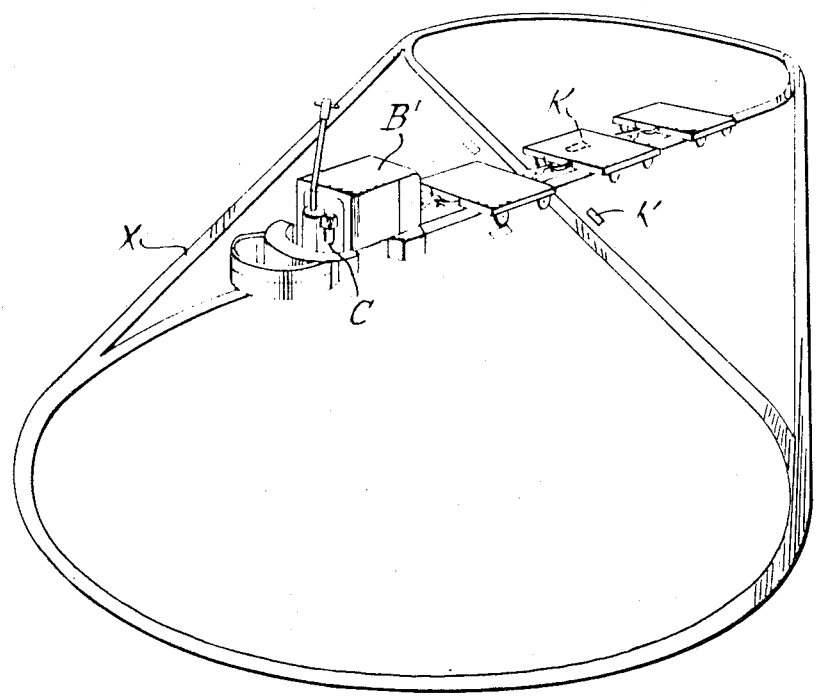
FIG. 1 is a perspective view of a track system on a ground level, which is provided with branches and crossings or intersections and with vehicle control means, in accordance with the present invention.
Figure 2:
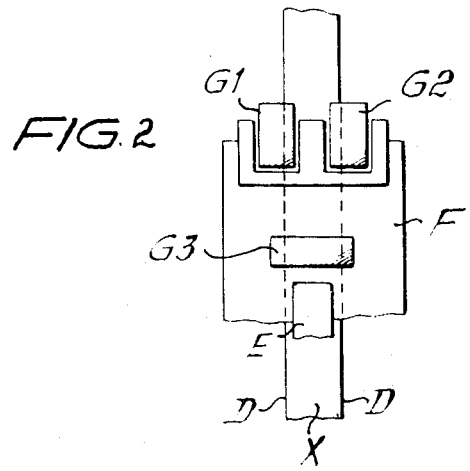
FIG. 2 is a plan view and shows the arrangement of an analog signal generator over control foil, together with a safety signal generator used in the system of FIG. 1.

Referring to the drawing, FIGS. 1 and 2 show a floor arrangement constructed of a network with branches and intersections of cross-overs, with the application of self-adhesive aluminum foil X. Switching contacts K are provided for switching of tracks and cross-over driving. The vehicle has, itself, a positioning element C and is supplied with electrical power from a battery, not shown. This battery is carried by the vehicle. As a safety feature, a drive-over member is provided at the front turnable portion, for the purpose of stopping the motion of the vehicle, as soon as an obstacle or obstruction is encountered on the driving path.

FIG. 2 shows the arrangement of two analog generators G1 and G2, over the edge D of the control foil X. The safety generator G3 is directly secured in front of the turnable wheel E, and switches off the control circuitry of FIG. 3, as soon as the vehicle leaves its track. Further driving is then made possible only after the obstruction has been removed, and setting of the generators with respect to the control foil track, as shown by the arrangement of G1–G2–G3 in FIG. 2. The control circuitry must, thereby, be restarted through a starting device, not shown. All three generators G1, G2, G3 are mounted on one console F, which is mechanically coupled with the positioning element C, and is swivelable with the turning arrangement. In this manner, the sidewise shifting of the activated one of the analog generators G1, G2 is in effect, until the projection of the edge of the electrically conductive material coincides with the centerline of the active zone of the generators.

The switching contacts K in FIG. 1 are used for crossings or cross-over driving, and the contacts may be designed in the form of, for example, reed contacts. The switching can also be accomplished through mechanical means by abutting the switch with appropriate means.

FIG. 3 shows all the essential elements of the present invention in a block diagram. In accordance with the sensing of the tracks, the output signal of the analog generator G1 or G2 are applied to operational amplifiers 1, 2 and the switching contact a3 of a relay, not shown further in the drawing. Diodes D3 and D4 are used for signal separation and isolation, and the signals from these diodes D3 and D4 are, in turn, applied to D.C. current amplifiers 3, 4. After exceeding a threshold level, a trigger circuit Tr triggers a relay S which, in turn, actuates a potential switch J. As a result, the signal is increased in magnitude, by the amount of the voltage divider setting. The current of the signal is amplified, and applied to an end stage 10 which is connected to a coil L1 of a positioning motor M'.

The negative signals are applied to the amplifier 4, through the diode D4, and to the subsequent inverting stage 6. After passing through the amplifiers 7, 9, 11 and an end stage 12, the signal is applied through the other coil or winding L2 of the positioning motor M'. Thus, the end stages 10 and 12 serve as power output stages for driving the motor M' in accordance with the signals applied by the preamplifiers or signal amplifiers 8 and 11. The amplifying chains 3, 5 and 8 serve to amplify the signal prior to power amplification by the end or output stage 10. In a similar manner, the amplifying stages 4, 7, 9 and 11 serve to amplify the signals prior to corresponding amplification in the end or power output stage 12.

FIG. 4 shows the voltage supply circuit for obtaining the different operating voltages U. In this voltage supply circuit, a D.C. voltage converter N is connected across a constant supply as, for example, a battery. The applied voltage of this battery is, then, converted by the circuit N into predetermined discrete voltage steps which are required by the arrangement of FIG. 3. Thus, one form of the unit N can be a conventional resistance decade box, for example.

Figure 5A:
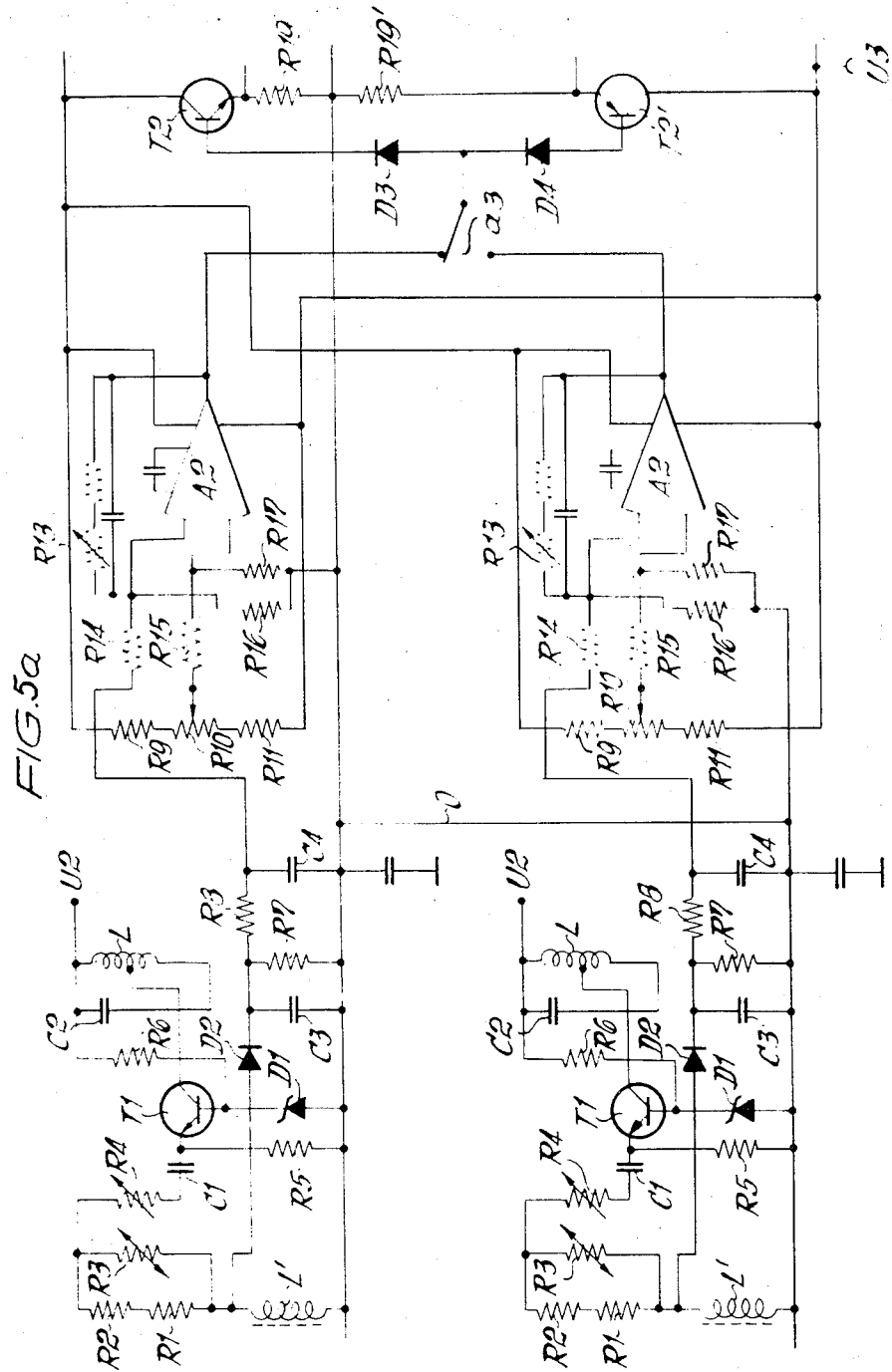
FIGS. 5a and 5b are electrical circuit diagrams showing the detailed components and their interconnections for the control circuit of FIG. 3.
Figure 5B:
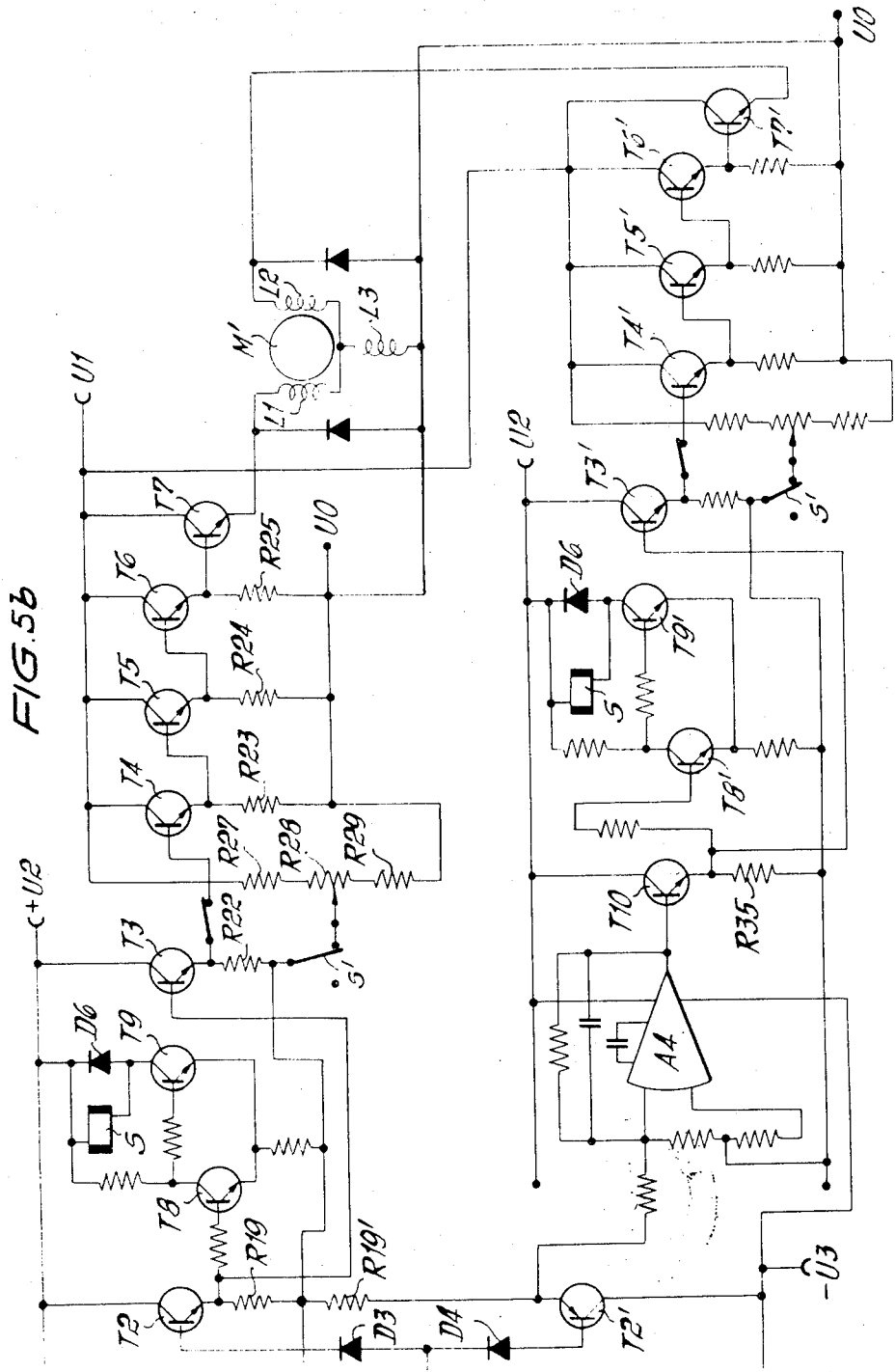

The analog signal generator shown in FIGS. 5a and 5b includes an oscillator provided with temperature compensation and rectification with filtering. In the collector circuit of the oscillating transistor T1, is the oscillating circuit including the capacitor C2 and inductance L. The latter has a tap connected to the collector of the transistor T1. The capacitor C2 is connected in parallel with inductance L. A resistor R6 is connected between the base of transistor T1 and one junction of the capacitor C2 and inductance L. A feedback winding L' is connected in the emitter circuit of the transistor T1. This emitter circuit includes an adjustable amplitude determining resistor R4 connected in series with a coupling capacitor C1 leading directly to the emitter of transistor T1. The resistors R1 and R2 connected in series serve as temperature-compensation resistors. These two series-connected resistors are connected across the adjustable resistor R3, and have a negative temperature coefficient of resistance for purposes of temperature compensation. Zener diode D1 connected to the base of transistor T1, the resistor R5 connected between the emitter of the transistor T1 and the Zener diode D1, as well as the resistor R6 determine the operating point of the common-base connected oscillating transistor T1.

Rectification and filtering is achieved through the feedback coupling winding L', through the action of diode D2 and capacitors C3, C4, as well as resistors R7 and R8. The diode D2 is connected between the feedback winding L' and one terminal of the capacitor C3. The resistor R7 is connected, in turn, in parallel with the capacitor C3, whereas the resistor R8 is connected between the capacitor C4 and the resistor R7. The magnetic field of the inductance L of the high-frequency oscillating circuit containing the capacitor C2 can emanate freely. As a result of the generation of eddy currents in electrically conductive material, this magnetic field can cause damping of the voltage amplitude of the oscillator.

The processing of the amplitude function by rectification, filtering and smoothing through D2, capacitors C3, C4 and resistors R7, R8 leads to the condition whereby the output voltage is made dependent on the displacement of the operating edge. Depending upon the displacement of the edge the output voltage lies within the range of, for example, zero to 2 volts. Both signal generators are connected to the current supply U2, and have a common ground line O, by which they both have applied to them equal potential. The amplification of the output signals is provided by the operational amplifier A2. A voltage divider including resistors R9, R10, and R11 connected in series, serve to set or adjust the zero operating point of the amplifier. The shifting of the zero operating point is made possible through the adjustable resistor R10 connected between resistors R9 and R11. This voltage divider is connected to one input of the operational amplifier A2. The arrangement of the voltage divider is such that the output of the operational amplifier provides an amplified voltage which lies, for example, within the range of plus or minus 24 volts maximum.

The magnitude of the amplification may be adjusted through the adjustable resistor R13 which is connected between the output of the amplifier A2 and one input thereof. The resistors R14, R15, R16, and R17 serve to trim and match the reference voltage to a predetermined magnitude in relation to ground potential. Thus, these resistors R14 to R17 are reference voltage resistors. The input signal is applied to the operational amplifier through the resistor R14 which, in turn, is connected to the signal input of the operational amplifier A2. The resistor R15 is connected in series with the other input of the operational amplifier A2. The resistor R17 is connected between ground potential and that other input of the operational amplifier, whereas the resistor R16 is connected between ground potential and the signal input of the operational amplifier.

Depending upon the track which is sensed or sampled, the relay contacts a3 are switched, and the signal is separately routed through diodes D3, and D4. The positive signals are amplified several times. The first amplification stage has a transistor T2 connected in a common-collector circuit including a resistor R19 connected between ground potential and the emitter of transistor T2. A corresponding resistor R19' is provided in conjunction with a corresponding transistor T2' for the second analog signal generator.

FIG. 5b is a continuation of the circuitry shown in FIG. 5a. The transistors T2 and T2' are shown in FIG. 5b to facilitate the tracing of the circuit of FIG. 5b in relation to that of FIG. 5a. A multiple-stage D.C. amplifier has transistors T3, T4, T5, T6 connected as a common-collector circuit. Resistors R23, R24, and R25 are connected between ground potential and respectively, the emitters of transistors T4, T5 and T6. An output transistor T7 has its base connected to the emitter of transistor T6, and the emitter of the output transistor T7 is connected directly to the winding L1 of the positioning motor M'. Thus, the signal output of the transistor T2 reaches the output transistor T7, through the D.C. amplifier with its multiple stages connected between ground potential and the collector of transistor T4, is a voltage divider including resistors R27, R28, and R29 connected in series. The voltage dividing resistor R28 is made of the variable-resistor type, and has its movable contact connected to the switch S', shown in FIG. 3.

The positioning motor M' has an operating voltage or nominal operating voltage of, for example, 24 volts, and a maximum operating current of, for example, 6 amperes. The minimum voltage to which the motor will respond and operate is, for example, 6 volts. In order to compensate against inertia properties, the trigger circuit applies an auxiliary voltage to the analog signal. This trigger circuit consists of transistors T8 and T9. The collector circuit of the transistor T9 includes the relay S with protective diode D6. Thus, the coil of the relay S is connected between the collector of transistor T9, and the collector of transistor T8. The protective diode D6 is connected in parallel with the coil of the relay S. When the voltage applied to the base of transistor T8 attains the triggering threshold level, then the relay S drops out or becomes de-energized. The voltage divider including resistors R27, R28 and R29 serves to raise the potential applied to the base of transistor T4.

The processing of the negative signals is achieved in a separate chain or cascade of amplifiers. The first amplifying stage includes the transistor T2' with associated resistor R19' connected in series with the emitter of this transistor. The operational amplifier A4 functions as an inverter, and has an amplification of 1:1. As a result, a positive signal is available at the output of this amplifier A4. This positive signal is then further amplified in the subsequent amplification stage including the transistor T10 and resistor R35 connected in series with the emitter of this transistor T10. The further construction of the circuit in the lower part of FIG. 5b is identical to the processing circuitry previously described in relation to the processing of the positive signals. The finally amplified output voltage through the output stage T7', is applied to the coil or winding L2 of the positioning motor M'.

In the other embodiment of FIG. 6, in accordance with the present invention, amplifiers 9, 11 and output stage 12 are omitted from the amplifying channel. Also omitted from this embodiment are the trigger circuit with potential switch shown in FIG. 3. When, in the embodiment of FIG. 6, the output signal of the amplifier 7 is switched at the instant that the signal passes through zero in the negative direction, through either a relay or corresponding electronic switching means, then the signal is applied to the inlet of the amplifier 5, and in a similar manner, the output signal from the end stage 10 is applied to the winding L2 of the motor M', instead of the motor winding L1. This switching action of the signal is achieved through the switching contacts a4 and a5. The motor winding L3 serves to apply the neutral voltage U0. The voltages U1 and U3 are positive and negative voltages, respectively.

It will be understood that each of the elements described, or two or more together, may also find a useful application in other types of vehicle steering arrangements differing from the types described above.

While the invention has been illustrated and described as embodied in a vehicle steering arrangement, it is not intended to be limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended

1. A guided-vehicle system, comprising, in combination, at least one vehicle; steering means for steering said vehicle; guide track means comprised of a material capable of conducting electrical current but being electrically unconnected to a source of current, said guide track means having an edge constitiuting a border between the electrically conductive material of said guide track means and electrically non-conductive material and defining a path of travel for said vehicle; field-generating means mounted on said vehicle spaced from said guide track means and operative for generating an A.C. magnetic field oriented to intersect the conductive material of said guide track means to an extent dependent upon the lateral deviation of said vehicle from the path defined by said edge, said field creating eddy currents in the conductive material of said guide track means resulting in dissipation of energy in said conductive material and causing said field to vary in strength in dependence upon said lateral deviation; signal generating means responsive to variations in the strength of said field and operative for generating a control signal which varies in dependence upon said lateral deviation; and control means connected to said steering means and to said signal generating means and operative for effecting steering of said vehicle in dependence upon said control signal in a direction reducing said lateral deviation so as to cause said vehicle to travel along the path defined by said edge.

2. A system as defined in claim 1, wherein said field-generating means has an active zone, and wherein said signal generating means comprises means for generating a control voltage having zero magnitude when the centerline of said active zone coincides with said edge, a positive magnitude proportional to said lateral deviation when the deviation is to one side of said edge and a negative magnitude proportional to said lateral deviation when the deviation is to the other side of said edge.

3. A system as defined in claim 1; and further including means for stopping said vehicle when said deviation exceeds a predetermined value.

4. A system as defined in claim 1; and further including a third field-generating means generating an A.C. magnetic field which intersects the material of said guide track means to an extent dependent upon said lateral deviation and creates eddy currents in said material producing a variation in the strength of the field produced by said third-generating means in dependence upon said lateral deviation; and further including means cooperating with said third field-generating means for stopping said vehicle when said lateral deviation exceeds a predetermined value.

5. A system as defined in claim 1; and further including auxiliary analog signal generator means arranged over said guide track means and registering variations in the spacing of said vehicle from said guide track means, said auxiliary analog signal generator means providing a compensating signal for compensating against variations in said spacing.

6. A system as defined in claim 1, wherein said signal generating means comprises operational amplifier means having two inputs and serving as an adder, means for applying to one of said inputs a signal indicative of the field strength of the activated one of said field-generating means and means for applying to the other of said inputs a nulling signal, so that the signal appearing at the output of the operational amplifier will have a desired predetermined null value when said lateral deviation is zero.

7. A system as defined in claim 1, wherein said guide track means comprises at least one metallic strip with a self-adhesive backing to facilitate laying of the strip upon a surface to form a guide track for said vehicle.

8. A system as defined in claim 7, wherein the material of said guide track means is electrically conductive and non-ferromagnetic.

9. A system as defined in claim 7, wherein the material of said guide track means is aluminum.

10. A system as defined in claim 1, wherein said signal-generating means is operative for generating a control signal having a first polarity when said deviation is to one side of said edge and for generating a control signal having an opposite second polarity when said deviation is to the other side of said edge, and wherein said control means includes diode means so connected to said signal-generating means as to separate control signals of said first polarity from control signals of said second polarity, said diode means being connected to said steering means for applying the separated control signals to said steering means for controlling the latter.

11. A system as defined in claim 10, wherein said steering means comprises steering motor means including one winding operative when energized for effecting turning of said vehicle in one direction and another winding operative when energized for effecting turning of said vehicle in the other direction, and wherein said control means comprises amplifier means and inverter means, and switch-over means operative when said control signal is of said first polarity for applying said control signal to said amplifier means via said inverter means and for connecting the output of said amplifier means to one of said windings for energizing the same, and operative when said control signal is of said second polarity for applying said control signal to said amplifier means without the intermediary of said inverter means and for connecting the output of said amplifier means to the other of said windings for energizing the same.

12. A system as defined in claim 11, wherein said switch-over means comprises relay means.

13. A system as defined in claim 12, wherein said switch-over means comprises electronic switch means.

14. A system as defined in claim 10, wherein said control means further includes first amplifying means operative for amplifying control signals to said first polarity and second amplifying means operative for amplifying control signals of said second polarity, the outputs of said first and second amplifying means being connected to said steering means for controlling the latter.

15. A system as defined in claim 14, wherein said control means further includes inverter means connecting said diode means to said second amplifying means to invert the polarity of control signals having said second polarity prior to application to said second amplifying means.

16. A system as defined in claim 1, wherein said steering means includes steering motor means for changing the direction of movement of said vehicle, and wherein said control means is operative for controlling the energization of said steering motor means in dependence upon said control signal, and wherein said control means comprises means operative when said control signal reaches a predetermined value indicative of excessive lateral deviation for effecting supplemental energization of said steering motor means in addition to the aforementioned energization, so as to effect rapid reduction of such excessive lateral deviation.

17. A system as defined in claim 16, wherein said means for effecting supplemental energization comprises threshold-detecting means connected to said signal generating means to receive said control signal and relay means connected to the output of said threshold-detecting means for activation when said control signal reaches said predetermined value, and means operable when said relay means is activated for effecting said supplemental energization of said steering motor means.

18. A system as defined in claim 1, wherein said steering means includes at least one turnable wheel, and wherein said field-generating means is mounted for turning movement together with said wheel.

19. A guided-vehicle system comprising, in combination, at least one vehicle; guide track means of electrically conductive material having two edges constituting borders between electrically conductive and electrically non-conductive material and each defining a respective path of travel for said vehicle; two alternatively activatable analog signal generator means on said vehicle, one associated with one of said edges and the other associated with the other of said edges, and each operative for directing a high-frequency magnetic field towards said guide track means, said magnetic field being damped by said electrically conductive material, and each of said two analog signal generator means having an active operating zone; and signal-furnishing means in said analog signal generator means for furnishing a voltage proportional to the projected displacement of the respective one of said borders relative to the centerline of the active zone of the activated one of said two analog signal generators, said voltage being positive when the displacement of said respective border is in one direction and negative when the displacement of said respective border is in direction opposite to said one direction, and said voltage being zero when the projection of said respective border coincides with the centerline of the active zone of the activated one of said two alternatively activatable analog signal generator means.

20. A system as defined in claim 19; and further comprising steering means on said vehicle connected to said signal-furnishing means and responsive to said signal for steering said vehicle in dependence upon said signal to maintain the centerline of the active zone of the activated one of said analog signal generators coincident with the respective border.

21. A guided-vehicle system, comprising, in combination, at least one vehicle; steering means for steering said vehicle; guide track means comprised of a material capable of conducting electrical current but being electrically unconnected to a source of current, said guide track means having two spaced edges constituting borders between electrically conductive and electrically non-conductive material and each defining a respective path of travel for said vehicle; two alternatively activatable field-generating means mounted on said vehicle spaced from said guide track means, one associated with one of said edges and the other associated with the other of said edges, and each operative when activated for generating an A.C. magnetic field oriented to intersect said guide track means to an extent dependent upon the lateral deviation of said vehicle from the path defined by the respective one of said edges, said A.C. magnetic field creating eddy currents in the conductive material of said guide track means resulting in dissipation of energy in said guide track means causing said field to vary in strength in dependence upon said lateral deviation; signal-generating means responsive to variations in the strength of said field and operative for generating a control signal which varies in dependence upon said lateral deviation; and control means connected to said steering means and to said signal generating means and operative for steering said vehicle in dependence upon said control signal in a direction reducing said lateral deviation so as to cause said vehicle to travel along the path defined by that one of said edges associated with the activated one of said two alternatively activatable field-generating means.

22. A system as defined in claim 21, wherein said guide track means comprises at least one branched member of electrically conductive material defining a branched path having a stem portion and two branch portions with one of said edges being an edge of said stem portion and continuing as an edge of one branch portion, and the other of said edges being the other edge of said stem portion and continuing as an edge of the other branch portion; and further including activating means for activating one or the other of said two alternatively activatable field-generating means to cause said steering means to steer said vehicle along the path defined by the edge associated with the activated one of said field-generating means, whereby to cause steering of said vehicle onto one or the other of said branch portions.

23. A system as defined in claim 21; and further including mechanical activating means for activating one or the other of said two alternatively activatable field-generating means.

24. A system as defined in claim 21; and further including electrical activating means for activating one or the other of said two alternatively activatable field-generating means.

* * * * *